(12) United States Patent
Jang (10) Patent No.: US 11,412,301 B2
(45) Date of Patent: Aug. 9, 2022

(54) DISPLAY DEVICE

(71) Applicant: LG ELECTRONICS INC., Seoul (KR)

(72) Inventor: Eun Kwang Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 17/109,903

(22) Filed: Dec. 2, 2020

(65) Prior Publication Data

US 2022/0021935 A1 Jan. 20, 2022

(30) Foreign Application Priority Data

Jul. 14, 2020 (KR) .................. 10-2020-0087043

(51) Int. Cl.
*H04N 21/442* (2011.01)
*H04N 21/41* (2011.01)

(52) U.S. Cl.
CPC ... *H04N 21/44231* (2013.01); *H04N 21/4104* (2013.01); *H04N 21/44236* (2013.01)

(58) Field of Classification Search
CPC ......... H04N 21/44231; H04N 21/4104; H04N 21/44236
See application file for complete search history.

(56) References Cited

U.S. PATENT DOCUMENTS

| | | | |
|---|---|---|---|
| 2011/0022739 A1* | 1/2011 | Guillerm | H04N 21/4367 710/18 |
| 2011/0150215 A1* | 6/2011 | Domingo | H04N 21/43632 380/200 |
| 2019/0191357 A1 | 6/2019 | Slav | |
| 2019/0324523 A1* | 10/2019 | Jen | H04L 12/4625 |
| 2020/0204179 A1* | 6/2020 | Lee | G11C 7/1084 |

FOREIGN PATENT DOCUMENTS

| | | |
|---|---|---|
| EP | 3190787 | 12/2017 |
| JP | 2019528030 | 10/2019 |

(Continued)

OTHER PUBLICATIONS

European Patent Office Application Serial No. 20211279.3, Search Report dated May 31, 2021, 4 pages.

(Continued)

*Primary Examiner* — Randy A Flynn
(74) *Attorney, Agent, or Firm* — Lee, Hong, Degerman, Kang & Waimey PC (57) ABSTRACT

The present disclosure provides a display device that includes an external input interface including an input port connected to a source device, and a processor configured to detect that a source device is connected through an unselected input port of a plurality of input ports, activate an external input interface corresponding to the unselected input port, perform a connection process between the source device and the external input interface, deactivate error detection operation between the source device and the (Continued)

external input interface, generate fake connection information for maintaining connection between the source device and the external input interface based on information input to the external input interface from the source device, and switch the external input interface to a standby mode.

15 Claims, 9 Drawing Sheets

(56) References Cited

FOREIGN PATENT DOCUMENTS

| | | |
|---|---|---|
| KR | 101618427 | 5/2016 |
| KR | 1020170055866 | 5/2017 |

OTHER PUBLICATIONS

Qualcomm Europe, "Further Enhancements to HSDPA Performance using a Frequency Domain Equalizer + Decision Feedback Equalizer (FDE+DFE) Receiver," TSG-RAN Working Group 4 (Radio) meeting RAN4#36, R4-050730, Aug.-Sep. 2005, 5 pages.
International Electrotechnical Commission, "Universal Serial Bus Interfaces for Data and Power—Part 3-1: Universal Serial Bus 3.1 Specification," IEC 62680-3-1/CDV, May 2015, 752 pages.
Korean Intellectual Property Office Application No. 10-2020-0087043, Office Action dated May 31, 2021, 5 pages.
Korean Intellectual Property Office Application No. 10-2020-0087043, Notice of Allowance dated Nov. 29, 2021, 6 pages.

* cited by examiner

FIG. 11 ized in consideration of only ease of writing of this specification, and do not have distinctive meanings or roles by themselves. Thus, the suffixes "module" and "unit" may be used interchangeably.

DISPLAY DEVICE

CROSS-REFERENCE TO RELATED APPLICATIONS

Pursuant to 35 U.S.C. § 119(a), this application claims the benefit of earlier filing date and right of priority to Korean Patent Application No. 10-2020-0087043, filed on Jul. 14, 2020, the contents of which are hereby incorporated by reference herein its entirety.

BACKGROUND OF THE INVENTION

1. Field of the Invention

The present disclosure relates to a display device, and more particularly, to a display device that switches between devices connected through display ports.

2. Discussion of the Related Art

With the recent increase in video devices, an input interface is provided between multimedia sources such as set-top boxes, smartphones, PCs, and notebooks that provide images and display devices that process and display digital images provided from multimedia sources. have.

However, the display device may be connected to source devices through a plurality of external input ports. The display device may go through a predetermined connection process whenever the source device is connected or switched.

However, there is a problem in that switching is delayed since a predetermined connection process is performed each time an external input is switched.

Accordingly, there is a growing need to reduce a delay time of input switching between a plurality of external inputs.

SUMMARY OF THE INVENTION

An object to be solved by the present disclosure is to reduce an input switching time when an external input is switched in a display device that provides a plurality of external inputs.

Another object to be solved by the present disclosure is to provide a display device that performs switching of an external input quickly by maintaining connection while minimizing power consumption and heat generation even when an external input is established through an external input port which a display device has not selected.

According to an embodiment of the present disclosure, a display device includes an external input interface including an input port connected to a source device, and a processor configured to detect that a source device is connected through an unselected input port of a plurality of input ports, activate an external input interface corresponding to the unselected input port, perform a connection process between the source device and the external input interface, deactivate error detection operation between the source device and the external input interface, generate fake connection information for maintaining connection between the source device and the external input interface based on information input to the external input interface from the source device, and switch the external input interface to a standby mode.

According to an embodiment of the present disclosure, a method for performing input switching between input ports in a display device includes connecting to a source device through an unselected input port of a plurality of input ports, activating an external input interface corresponding to the unselected input port, performing a connection process between the source device and the external input interface, deactivating error detection operation between the source device and the external input interface, generating fake connection information for maintaining connection between the source device and the external input interface based on information input to the external input interface from the source device, and switching the external input interface to a standby mode.

According to the embodiments of the present disclosure, it is possible to reduce an input switching time when the external input is switched in a display device that provides a plurality of external inputs.

According to the embodiments of the present disclosure, it is possible to perform switching of an external input quickly by maintaining connection while minimizing power consumption and heat generation even when an external input is established through an external input port which a display device has not selected.

DETAILED DESCRIPTION OF THE PREFERRED EMBODIMENTS

Hereinafter, specific embodiments of the present disclosure will be described in detail with reference to the drawings.

Hereinafter, embodiments relating to the present disclosure will be described in detail with reference to the accompanying drawings. The suffixes "module" and "unit" for components used in the description below are assigned or mixed in consideration of easiness in writing the specification and do not have distinctive meanings or roles by themselves.

A display device according to an embodiment of the present disclosure, for example, as an artificial display device that adds a computer supporting function to a broadcast receiving function, can have an easy-to-use interface such as a writing input device, a touch screen, or a spatial remote control device as an Internet function is added while fulfilling the broadcast receiving function. Then, with the support of a wired or wireless Internet function, it is possible to perform an e-mail, web browsing, banking, or game function in access to Internet and computers. In order to perform such various functions, standardized general purpose OS can be used.

Accordingly, since various applications are freely added or deleted on a general purpose OS kernel, a display device described herein, for example, can perform various user-friendly functions. The display device, in more detail, can be a network TV, Hybrid Broadcast Broadband TV (HBBTV), smart TV, light-emitting diode (LED) TV, organic light-emitting diode (OLED) TV, and so on and in some cases, can be applied to a smartphone.

Figure 1:
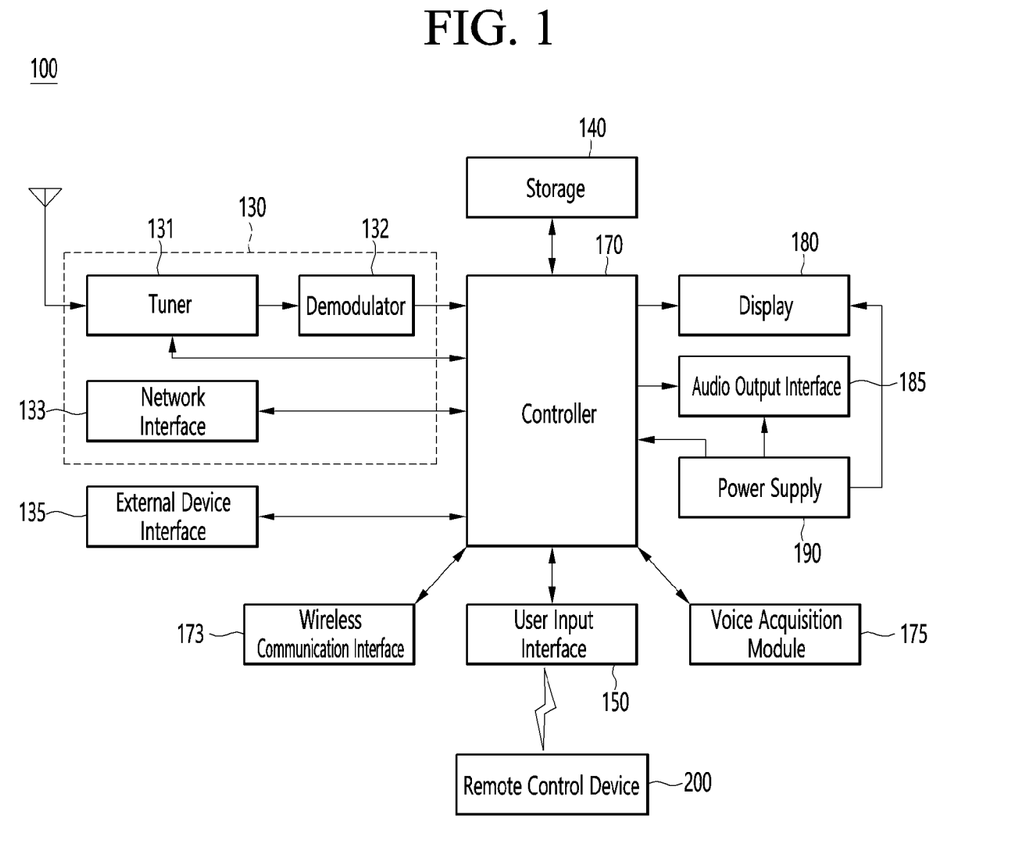
FIG. 1 is a block diagram illustrating a configuration of a display device according to an embodiment of the present disclosure.

FIG. 1 is a block diagram illustrating a configuration of a display device according to an embodiment of the present disclosure.

Referring to FIG. 1, a display device 100 can include a broadcast reception unit 130, an external device interface unit 135, a storage unit 140, a user interface unit 150, a control unit, a wireless communication unit 173, a display unit 180, an audio output unit 185, and a power supply unit 190.

The broadcast reception unit 130 can include a tuner 131, a demodulation unit 132, and a network interface unit 133.

The tuner 131 can select a specific broadcast channel according to a channel selection command. The tuner 131 can receive broadcast signals for the selected specific broadcast channel.

The demodulation unit 132 can divide the received broadcast signals into video signals, audio signals, and broadcast program related data signals and restore the divided video signals, audio signals, and data signals to an output available form.

The external device interface unit 135 can receive an application or an application list in an adjacent external device and deliver it to the control unit 170 or the storage unit 140.

The external device interface unit 135 can provide a connection path between the display device 100 and an external device. The external device interface unit 135 can receive at least one an image or audio output from an external device that is wirelessly or wiredly connected to the display device 100 and deliver it to the control unit 170. The external device interface unit 135 can include a plurality of external input terminals. The plurality of external input terminals can include an RGB terminal, at least one High Definition Multimedia Interface (HDMI) terminal, and a component terminal.

An image signal of an external device input through the external device interface unit 135 can be output through the display unit 180. A voice signal of an external device input through the external device interface unit 135 can be output through the audio output unit 185.

An external device connectable to the external device interface unit 135 can be one of a set-top box, a Blu-ray player, a DVD player, a game console, a sound bar, a smartphone, a PC, a USB Memory, and a home theater system, but this is just exemplary.

The network interface unit 133 can provide an interface for connecting the display device 100 to a wired/wireless network including the Internet network. The network interface unit 133 can transmit or receive data to or from another user or another electronic device through an accessed network or another network linked to the accessed network.

Additionally, some content data stored in the display device 100 can be transmitted to a user or an electronic device, which is selected from other users or other electronic devices pre-registered in the display device 100.

The network interface unit 133 can access a predetermined webpage through an accessed network or another network linked to the accessed network. In other words, the network interface unit 133 can transmit or receive data to or from a corresponding server by accessing a predetermined webpage through the network.

Then, the network interface unit 133 can receive contents or data provided from a content provider or a network operator. In other words, the network interface unit 133 can receive contents such as movies, advertisements, games, VODs, and broadcast signals, which are provided from a content provider or a network provider, through network and information relating thereto.

Additionally, the network interface unit 133 can receive firmware update information and update files provided from a network operator and transmit data to an Internet or content provider or a network operator.

The network interface unit 133 can select and receive a desired application among applications open to the air, through network.

The storage unit 140 can store signal-processed image, voice, or data signals stored by a program in order for each signal processing and control in the control unit 170.

Additionally, the storage unit 140 can perform a function for temporarily storing image, voice, or data signals output from the external device interface unit 135 or the network interface unit 133 and can store information on a predetermined image through a channel memory function.

The storage unit 140 can store an application or an application list input from the external device interface unit 135 or the network interface unit 133.

The display device 100 can play content files (for example, video files, still image files, music files, document files, application files, and so on) stored in the storage unit 140 and provide them to a user.

The user interface unit 150 can deliver signals input by a user to the control unit 170 or deliver signals from the control unit 170 to a user. For example, the user interface unit 150 can receive or process control signals such as power on/off, channel selection, and screen setting from the remote control device 200 or transmit control signals from the control unit 170 to the remote control device 200 according to various communication methods such as Bluetooth, Ultra Wideband (WB), ZigBee, Radio Frequency (RF), and IR.

Additionally, the user interface unit 150 can deliver, to the control unit 170, control signals input from local keys (not illustrated) such as a power key, a channel key, a volume key, and a setting key.

Image signals that are image-processed in the control unit 170 can be input to the display unit 180 and displayed as an image corresponding to corresponding image signals. Additionally, image signals that are image-processed in the control unit 170 can be input to an external output device through the external device interface unit 135.

Voice signals processed in the control unit 170 can be output to the audio output unit 185. Additionally, voice signals processed in the control unit 170 can be input to an external output device through the external device interface unit 135.

Besides that, the control unit 170 can control overall operations in the display device 100. Additionally, the control unit 170 can control the display device 100 by a user command or internal program input through the user interface unit 150 and download a desired application or application list into the display device 100 in access to network.

The control unit 170 can output channel information selected by a user together with processed image or voice signals through the display unit 180 or the audio output unit 185.

Additionally, according to an external device image playback command received through the user interface unit 150, the control unit 170 can output image signals or voice signals of an external device such as a camera or a camcorder, which are input through the external device interface unit 135, through the display unit 180 or the audio output unit 185.

Moreover, the control unit 170 can control the display unit 180 to display images and control broadcast images input through the tuner 131, external input images input through the external device interface unit 135, images input through the network interface unit, or images stored in the storage unit 140 to be displayed on the display unit 180. In this case, an image displayed on the display unit 180 can be a still image or video and also can be a 2D image or a 3D image.

Additionally, the control unit 170 can play content stored in the display device 100, received broadcast content, and external input content input from the outside, and the content can be in various formats such as broadcast images, external input images, audio files, still images, accessed web screens, and document files.

The wireless communication unit 173 can perform a wired or wireless communication with an external electronic device. The wireless communication unit 173 can perform short-range communication with an external device. For this, the wireless communication unit 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication unit 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication unit 173 can detect (or recognize) a communicable wearable device around the display device 100. Furthermore, if the detected wearable device is a device authenticated to communicate with the display device 100, the control unit 170 can transmit at least part of data processed in the display device 100 to the wearable device through the wireless communication unit 173. Accordingly, a user of the wearable device can use the data processed in the display device 100 through the wearable device.

The display unit 180 can convert image signals, data signals, or on-screen display (OSD) signals, which are processed in the control unit 170, or images signals or data signals, which are received in the external device interface unit 135, into R, G, and B signals to generate driving signals.

Meanwhile, the display device 100 illustrated in FIG. 1 is just one embodiment of the present disclosure and thus, some of the components illustrated can be integrated, added, or omitted according to the specification of the actually implemented display device 100.

In other words, if necessary, two or more components can be integrated into one component or one component can be divided into two or more components and configured. Additionally, a function performed by each block is to describe an embodiment of the present disclosure and its specific operation or device does not limit the scope of the present disclosure.

According to another embodiment of the present disclosure, unlike FIG. 1, the display device 100 can receive images through the network interface unit 133 or the external device interface unit 135 and play them without including the tuner 131 and the demodulation unit 132.

For example, the display device 100 can be divided into an image processing device such as a set-top box for receiving broadcast signals or contents according to various network services and a content playback device for playing contents input from the image processing device.

In this case, an operating method of a display device according to an embodiment of the present disclosure described below can be performed by one of the display device described with reference to FIG. 1, an image processing device such as the separated set-top box, and a content playback device including the display unit 180 and the audio output unit 185.

Figure 2:
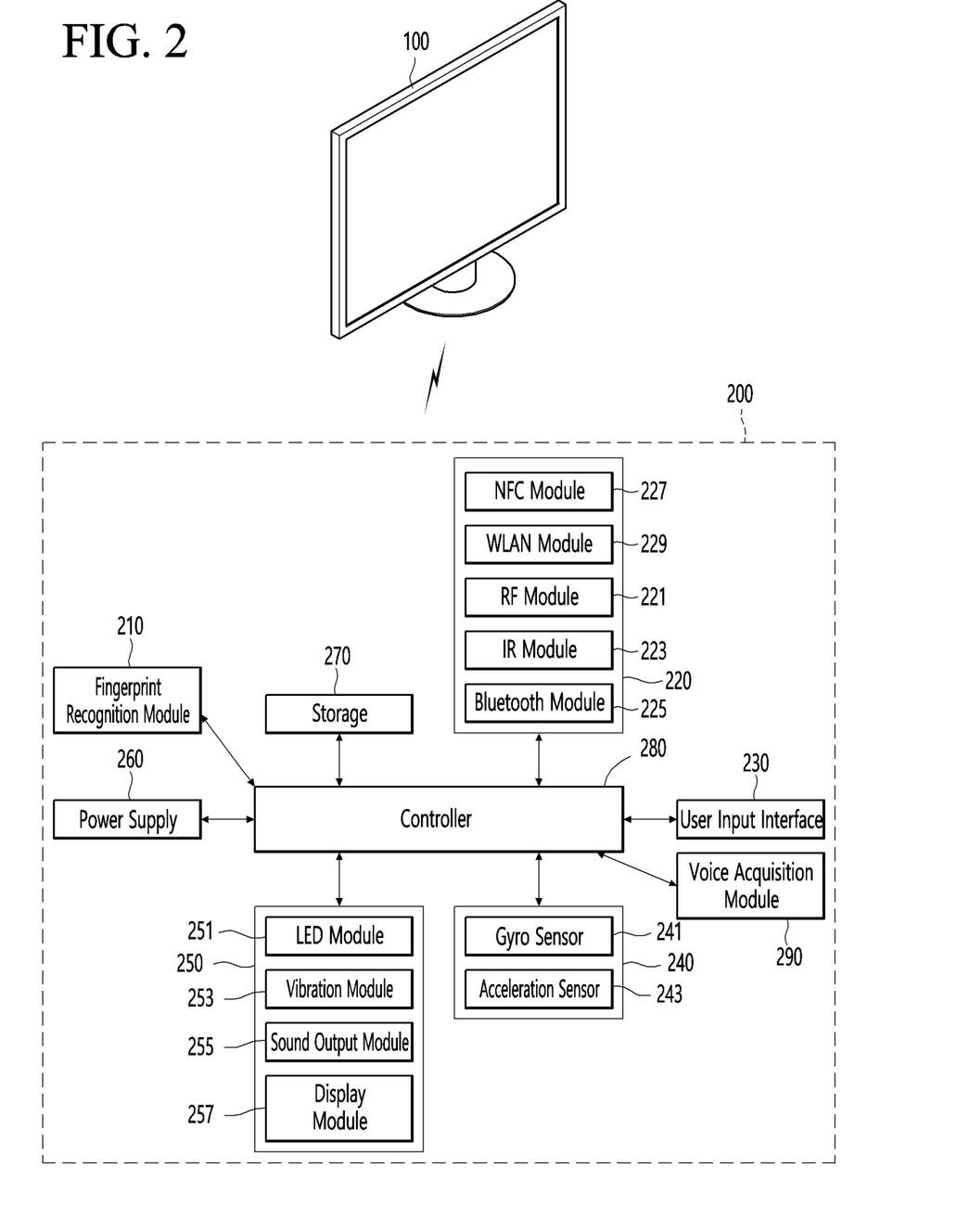
FIG. 2 is a block diagram illustrating a remote control device according to an embodiment of the present disclosure.
Figure 3:
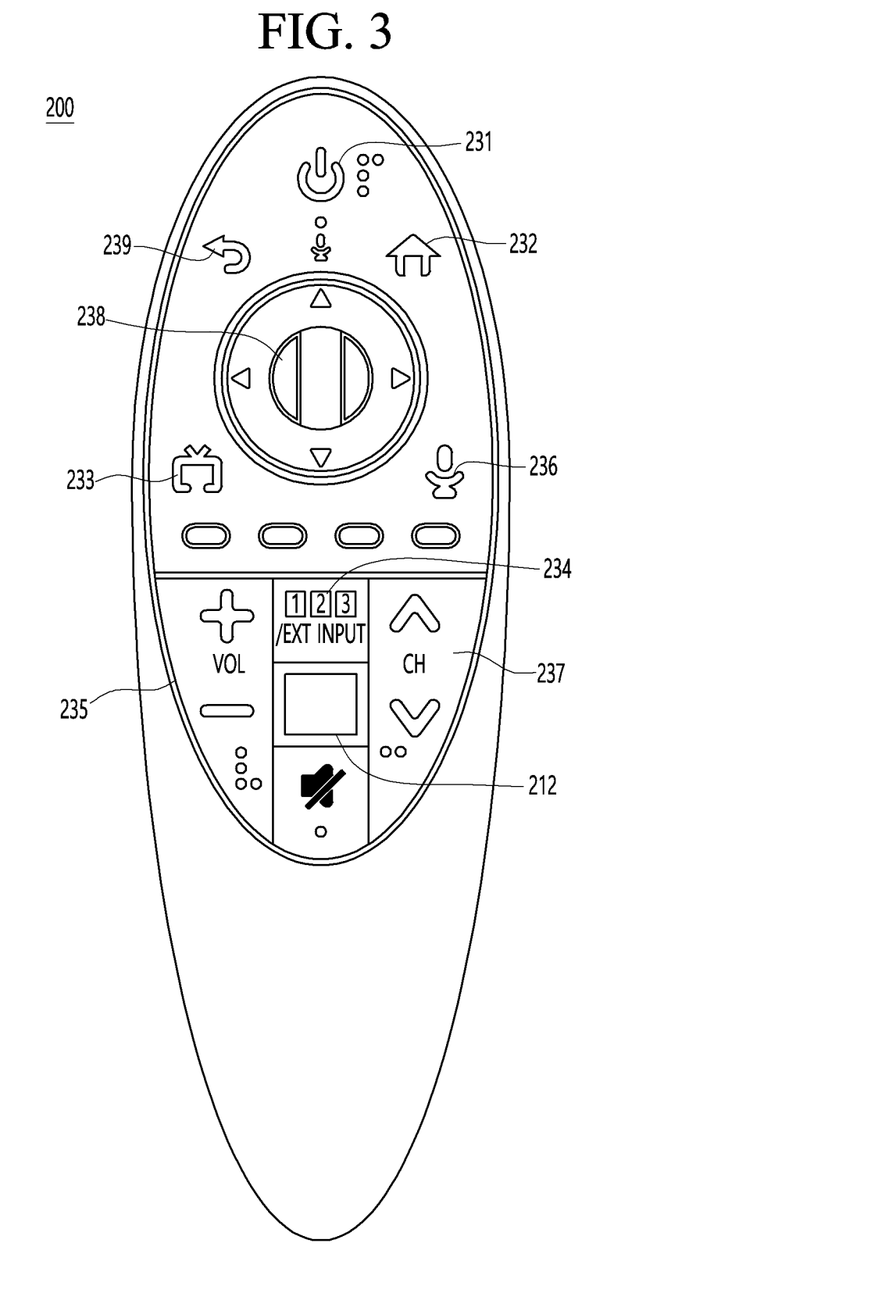
FIG. 3 is a view illustrating an actual configuration of a remote control device according to an embodiment of the present disclosure.

Then, referring to FIGS. 2 and 3, a remote control device is described according to an embodiment of the present disclosure.

FIG. 2 is a block diagram illustrating a remote control device according to an embodiment of the present disclosure and FIG. 3 is a view illustrating an actual configuration of a remote control device 200 according to an embodiment of the present disclosure.

First, referring to FIG. 2, a remote control device 200 can include a fingerprint recognition unit 210, a wireless communication unit 220, a user input unit 230, a sensor unit 240, an output unit 250, a power supply unit 260, a storage unit 270, a control unit 280, and a voice acquisition unit 290.

Referring to FIG. 2, the wireless communication unit 220 transmits/receives signals to/from an arbitrary any one of display devices according to the above-mentioned embodiments of the present disclosure.

The remote control device 200 can include a radio frequency (RF) module 221 for transmitting/receiving signals to/from the display device 100 according to the RF communication standards and an IR module 223 for transmitting/receiving signals to/from the display device 100 according to the IR communication standards. Additionally, the remote control device 200 can include a Bluetooth module 225 for transmitting/receiving signals to/from the display device 100 according to the Bluetooth communication standards. Additionally, the remote control device 200 can include a Near Field Communication (NFC) module 227 for transmitting/receiving signals to/from the display device 100 according to the NFC communication standards and a WLAN module 229 for transmitting/receiving signals to/from the display device 100 according to the Wireless LAN (WLAN) communication standards.

Additionally, the remote control device 200 can transmit signals containing information on a movement of the remote control device 200 to the display device 100 through the wireless communication unit 220.

Moreover, the remote control device 200 can receive signals transmitted from the display device 100 through the RF module 221 and if necessary, can transmit a command on power on/off, channel change, and volume change to the display device 100 through the IR module 223.

The user input unit 230 can be configured with a keypad button, a touch pad, or a touch screen. A user can manipulate the user input unit 230 to input a command relating to the display device 100 to the remote control device 200. If the user input unit 230 includes a hard key button, a user can input a command relating to the display device 100 to the remote control device 200 through the push operation of the hard key button. This will be described with reference to FIG. 3.

Referring to FIG. 3, the remote control device 200 can include a plurality of buttons. The plurality of buttons can include a fingerprint recognition button 212, a power button 231, a home button 232, a live button 233, an external input button 234, a voice adjustment button 235, a voice recognition button 236, a channel change button 237, a check button 238, and a back button 239.

The fingerprint recognition button 212 can be a button for recognizing a user's fingerprint. According to an embodiment of the present disclosure, the fingerprint recognition button 212 can perform a push operation and receive a push operation and a fingerprint recognition operation. The power button 231 can be button for turning on/off the power of the display device 100. The home button 232 can be a button for moving to the home screen of the display device 100. The live button 233 can be a button for displaying live broadcast programs. The external input button 234 can be a button for receiving an external input connected to the display device 100. The voice adjustment button 235 can be a button for adjusting the size of a volume output from the display device 100. The voice recognition button 236 can be a button for receiving user's voice and recognizing the received voice. The channel change button 237 can be a button for receiving broadcast signals of a specific broadcast channel. The check button 238 can be a button for selecting a specific function and the back button 239 can be a button for returning to a previous screen.

FIG. 2 will be described again.

If the user input unit 230 includes a touch screen, a user can touch a soft key of the touch screen to input a command relating to the display device 100 to the remote control device 200. Additionally, the user input unit 230 can include various kinds of input means manipulated by a user, for example, a scroll key and a jog key, and this embodiment does not limit the scope of the present disclosure.

The sensor unit 240 can include a gyro sensor 241 or an acceleration sensor 243 and the gyro sensor 241 can sense information on a movement of the remote control device 200.

For example, the gyro sensor 241 can sense information on an operation of the remote control device 200 on the basis of x, y, and z axes and the acceleration sensor 243 can sense information on a movement speed of the remote control device 200. Moreover, the remote control device 200 can further include a distance measurement sensor and sense a distance with respect to the display unit 180 of the display device 100.

The output unit 250 can output image or voice signals corresponding to manipulation of the user input unit 235 or corresponding to signals transmitted from the display device 100. A user can recognize whether the user input unit 235 is manipulated or the display device 100 is controlled through the output unit 250.

For example, the output unit 250 can include an LED module 251 for flashing, a vibration module 253 for generating vibration, a sound output module 255 for outputting sound, or a display module 257 for outputting an image, if the user input unit 235 is manipulated or signals are transmitted/received to/from the display device 100 through the wireless communication unit 225.

Additionally, the power supply unit 260 supplies power to the remote control device 200 and if the remote control device 200 does not move for a predetermined time, stops the power supply, so that power waste can be reduced. The power supply unit 260 can resume the power supply if a predetermined key provided at the remote control device 200 is manipulated.

The storage unit 270 can store various kinds of programs and application data necessary for control or operation of the remote control device 200. If the remote control device 200 transmits/receives signals wirelessly through the display device 100 and the RF module 221, the remote control device 200 and the display device 100 transmits/receives signals through a predetermined frequency band.

The control unit 280 of the remote control device 200 can store, in the storage unit 270, information on a frequency band for transmitting/receiving signals to/from the display device 100 paired with the remote control device 200 and refer to it.

The control unit 280 controls general matters relating to control of the remote control device 200. The control unit 280 can transmit a signal corresponding to a predetermined key manipulation of the user input unit 235 or a signal corresponding to movement of the remote control device 200 sensed by the sensor unit 240 to the display device 100 through the wireless communication unit 225.

Additionally, the voice acquisition unit 290 of the remote control device 200 can obtain voice.

The voice acquisition unit 290 can include at least one microphone 291 and obtain voice through the microphone 291.

Figure 4:
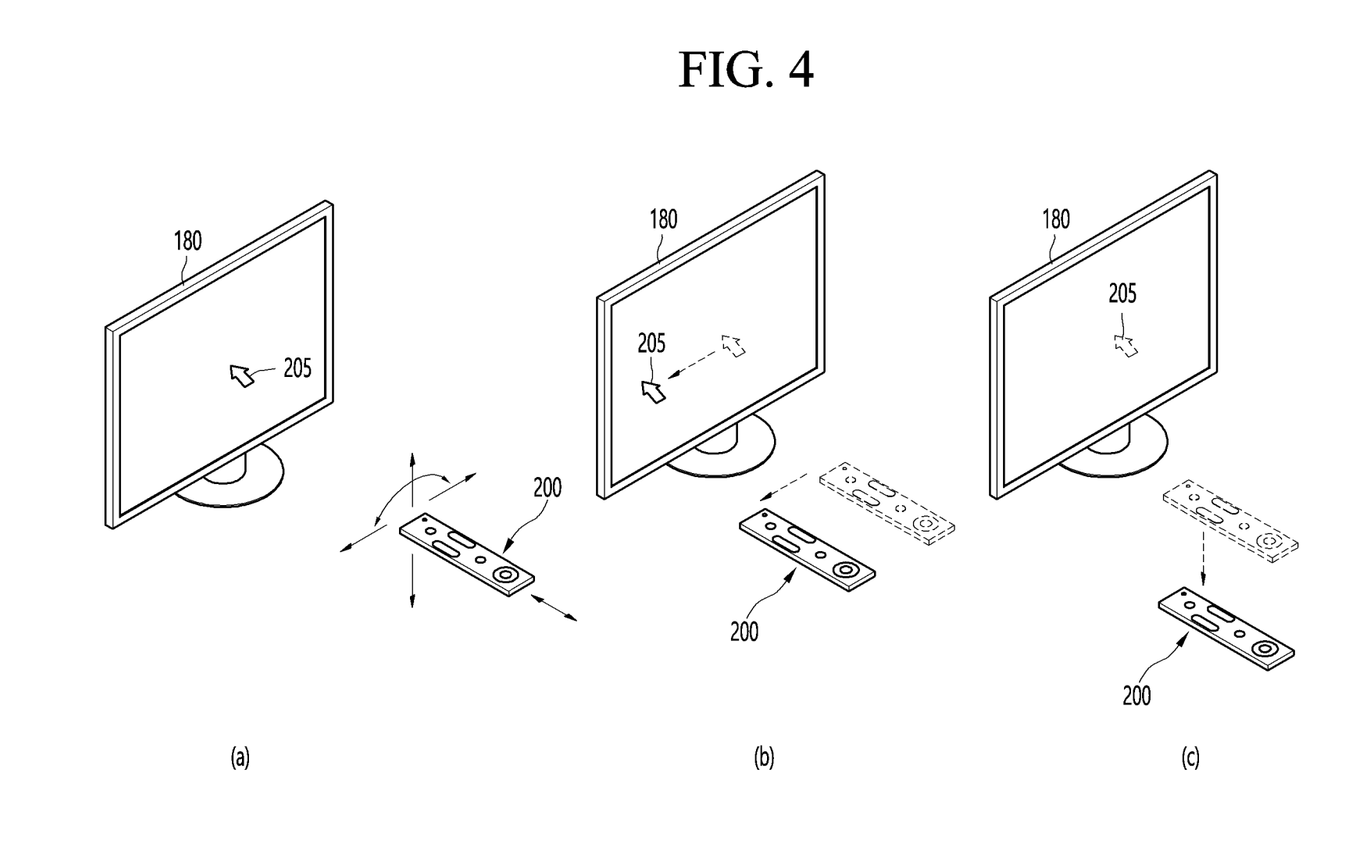
FIG. 4 is a view of utilizing a remote control device according to an embodiment of the present disclosure.

Next, FIG. 4 is illustrated.

FIG. 4 is a view of utilizing a remote control device according to an embodiment of the present disclosure.

FIG. 4(a) illustrates that a pointer 205 corresponding to the remote control device 200 is displayed on the display unit 180.

A user can move or rotate the remote control device 200 vertically or horizontally. The pointer 205 displayed on the display unit 180 of the display device 100 corresponds to a movement of the remote control device 200. Since the corresponding pointer 205 is moved and displayed according to a movement on a 3D space as show in the drawing, the remote control device 200 can be referred to as a spatial remote control device.

FIG. 4(b) illustrates that if a user moves the remote control device 200, the pointer 205 displayed on the display unit 180 of the display device 100 is moved to the left according to the movement of the remote control device 200.

Information on a movement of the remote control device 200 detected through a sensor of the remote control device 200 is transmitted to the display device 100. The display device 100 can calculate the coordinates of the pointer 205 from the information on the movement of the remote control device 200. The display device 100 can display the pointer 205 to match the calculated coordinates.

FIG. 4(*c*) illustrates that while a specific button in the remote control device 200 is pressed, a user moves the remote control device 200 away from the display unit 180. Thus, a selection area in the display unit 180 corresponding to the pointer 205 can be zoomed in and displayed larger.

On the contrary, if the user moves the remote control device 200 to approach the display unit 180, the selection area in the display unit 180 corresponding to the pointer 205 may be zoomed out and reduced.

On the other hand, if the remote control device 200 is moved away from the display unit 180, a selection area can be zoomed out and if the remote control device 200 is moved closer to the display unit 180, a selection area can be zoomed in.

Additionally, if a specific button in the remote control device 200 is pressed, recognition of a vertical or horizontal movement can be excluded. In other words, if the remote control device 200 is moved away from or closer to the display unit 180, the up, down, left, or right movement cannot be recognized and only the back and forth movement can be recognized. While a specific button in the remote control device 200 is not pressed, only the pointer 205 is moved according to the up, down, left or right movement of the remote control device 200.

Moreover, the moving speed or moving direction of the pointer 205 can correspond to the moving speed or moving direction of the remote control device 200.

Furthermore, a pointer in this specification means an object displayed on the display unit 180 in response to an operation of the remote control device 200. Accordingly, besides an arrow form displayed as the pointer 205 in the drawing, various forms of objects are possible. For example, the above concept includes a point, a cursor, a prompt, and a thick outline. Then, the pointer 205 can be displayed in correspondence to one point of a horizontal axis and a vertical axis on the display unit 180 and also can be displayed in correspondence to a plurality of points such as a line and a surface.

Meanwhile, the control unit 170 may also be referred to as a processor 170. In addition, the external device interface unit 135 may also be referred to as an external input interface 135. In addition, more than one external input interface 135 may exist, and each external input interface 135 may include an input port. For example, the input port may include an HDMI port.

Figure 5:
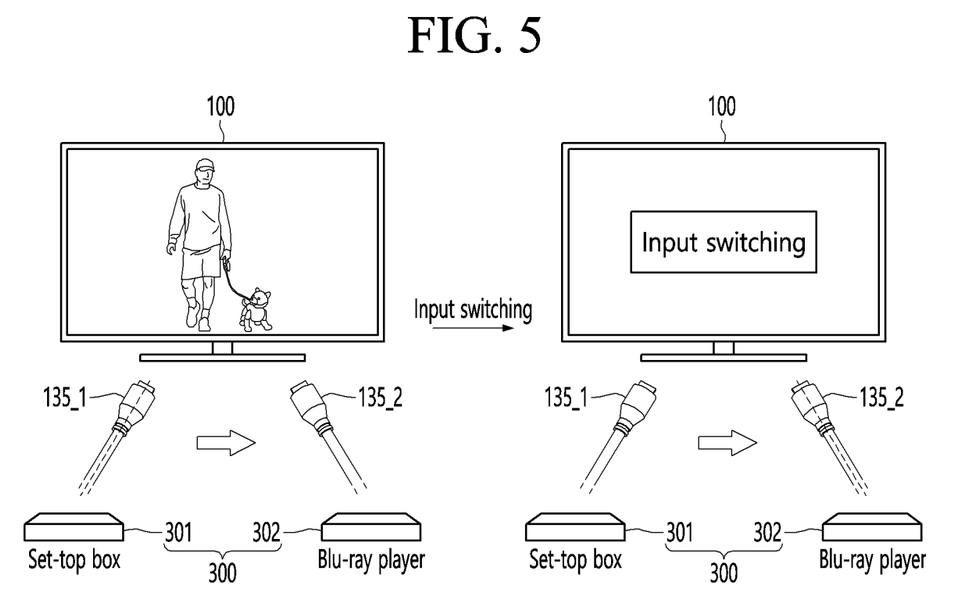
FIG. 5 is a diagram for describing a switching delay phenomenon occurring when an external input is switched.

FIG. 5 is a diagram for describing a switching delay phenomenon occurring when an external input is switched.

A source device 300 may be connected to the display device 100 through an external input interface 135.

Meanwhile, when the source device 300 is connected to the display device 100 through the external input interface 135, a predetermined connection process may be performed.

For example, the source device 300 and the display device 100 may be subjected to a connection process as follows. The source device 300 and the display device 100 may be connected to each other to enable data transmission through an HDMI port. In this case, when the source device 300 and the display device 100 are interconnected and a voltage of 5V is applied from the source device 300, the display device 100 may determine that the source device 300 is connected thereto through an HDMI cable.

In addition, when a hot plug detection (HPD) signal is input from the display device 100, the source device 300 may determine that the display device is connected thereto. The HPD signal may be a signal indicating a time when the source device 300 reads out Extended Display Identification Data (EDID) from the display device.

The source device 300 may read out the EDID from the display device while the HPD signal is being input. In addition, the source device 300 may determine whether the display device 100 is subjected to HDCP authentication. In this case, the source device 300 may read out an HDCP authentication key of the display device 100 and, when the authentication keys match each other, may provide a digital image showing a normal screen to the display device.

This connection process may be also performed when one external input is switched to another external input.

Referring to FIG. 5, a first source device 301 may be connected to the display device 100 through a first external input interface including a first input port which is connected to a first input cable 135_1. In addition, a second source device 302 may be connected to the display apparatus 100 through a second external input interface including a second input port which is connected to a second input cable 135_2.

For example, the display device 100 may receive a command for outputting an image received from the first source device 301 through the user input interface 150. That is, the first input port may be selected as an input port for receiving an image to be displayed on a display, and the second input port may not be selected as an input port for receiving an image to be displayed. In this case, the display device 100 may output an image received from the first source device 301 through the first external input interface including a first input port which is connected to a first input cable 135_1, and may not output an input received from the second source device 301 through the second external input interface including a second input port which is connected to a second input cable 135_2.

Meanwhile, the display device 100 may receive a command for outputting an image received from the second source device 302 through the user input interface 150. In this case, input switching from a first external input that has already been selected to a second external input that has not been selected may occur The display device 100 may be subjected to a predetermined connection process between the second source device 302 and the second external input interface 135_2. Accordingly, a predetermined time may be required until the image received from the second source device 302 is output through the display, thus causing a phenomenon in which the output is delayed.

Figure 6:
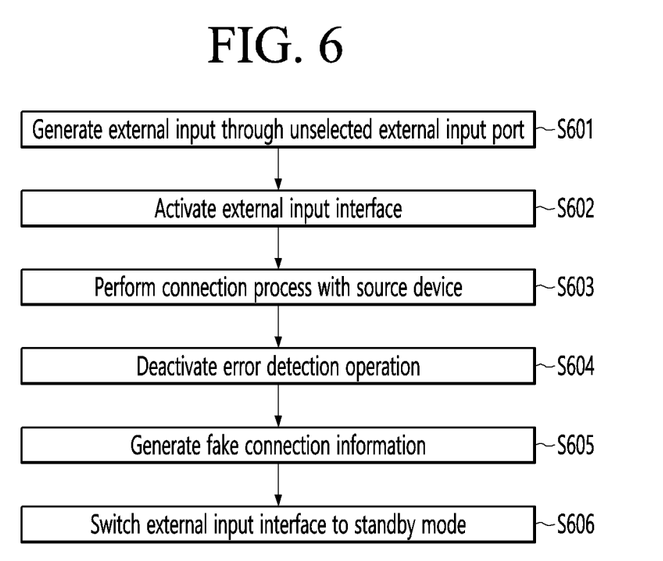
FIG. 6 is a flowchart for describing an input switching method according to an embodiment of the present disclosure.

FIG. 6 is a flowchart for describing an input switching method according to an embodiment of the present disclosure.

The processor 170 may detect that the source device 300 is connected through an unselected input port among a plurality of input ports (S601).

For example, when the source device 300 and the external input interface 135 are connected, a current of 5V may be applied to the external input interface 135 from the source device 300, and the processor 170 may detect that the source device 300 is connected.

The processor 170 may detect that the source device is connected through another input port that is not selected in a situation in which an input port for receiving an image to be displayed on the display is selected.

When the source device 300 is connected, the processor 170 may activate the external input interface 135 corresponding to an unselected input port (S602).

When the source device 300 is connected through an unselected input port, the processor 170 may activate a corresponding external input interface 135. For example, the processor 170 may operate an EEPROM in which the EDID information of the external input interface 135 is stored, and a related circuit.

The processor 170 may perform a connection process between the source device and the external input interface (S603).

For example, the processor 170 may transmit a hot plug detection (HPD) signal to the source device 300, and the processor 170 may notify the source device 300 that an EDID (Extended Display Identification Data) related circuit is activated and it is possible to access the EDID information.

In addition, the processor 170 may receive a request for reading out EDID from the source device 300 and transmit EDID information to the source device 300.

In addition, the processor 170 may exchange a high-bandwidth digital content protection (HDCP) key with the source device 300 and perform an encryption protocol.

The processor 170 may deactivate error detection operation between the source device 300 and the external input interface 135 (S604).

For example, the source device 300 and the display device 100 may use a packet structure when transmitting and receiving data and may use a BCH error correction code and error reduction coding to achieve data reliability.

The processor 170 may deactivate error detection operation to generate fake connection information. Accordingly, it is possible to prevent an error from occurring since the fake connection information is the object of error detection.

The processor 170 may generate fake connection information for maintaining a connection between the source device 300 and the external input interface 135 based on information input from the source device 300 to the external input interface 135. (S604).

The fake connection information is information generated based on information input from the source device 300 to the external input interface 135, and may be information capable of maintaining a connection even when at least a part of the external input interface 135 is turned off.

The processor 170 may generate fake connection information based on information input from the source device 300 to the external input interface 135 (S605).

Figure 7:
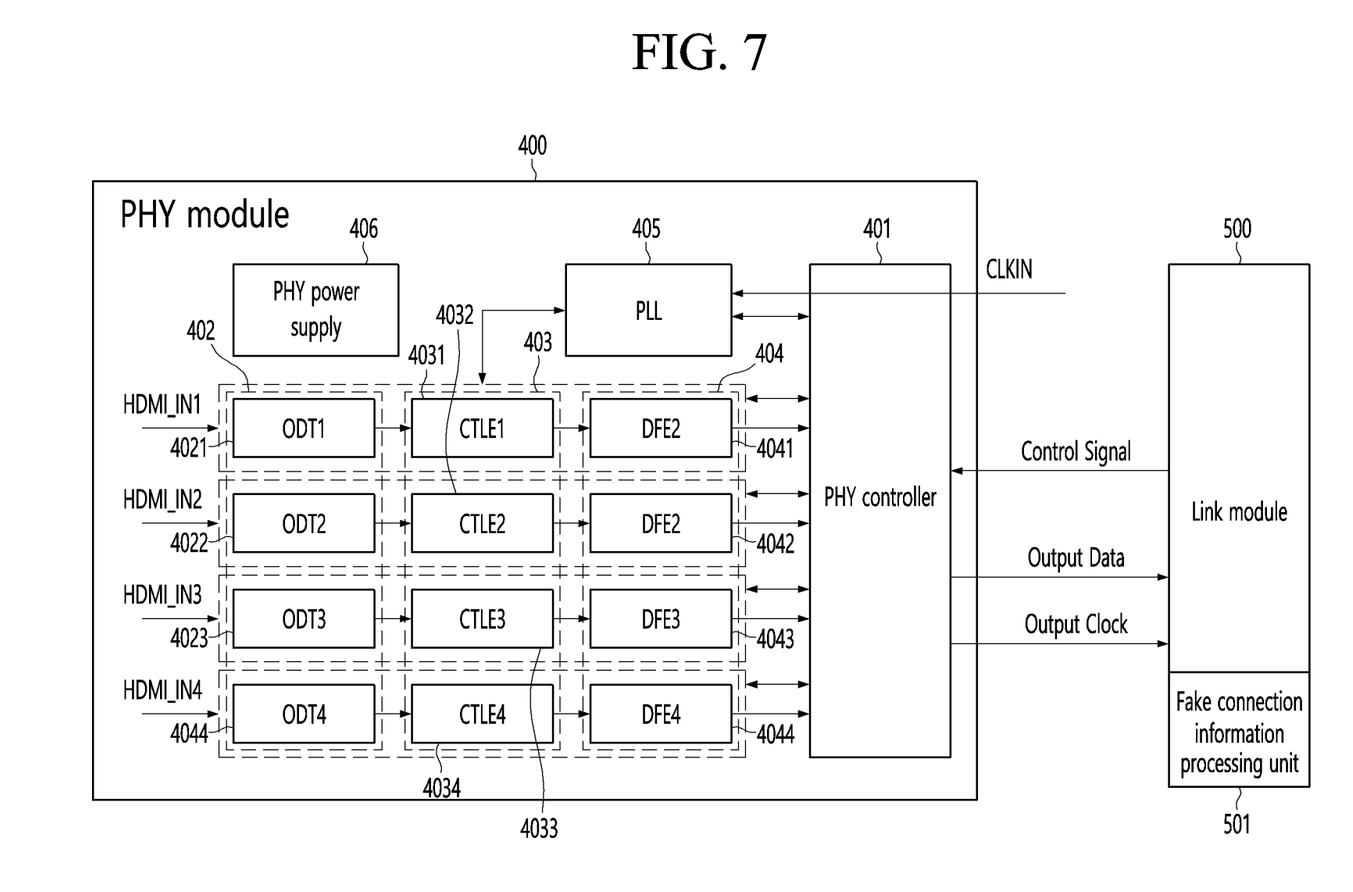
FIG. 7 is a block diagram showing an external input interface according to an embodiment of the present disclosure.

FIG. 7 is a block diagram showing an external input interface 135 according to an embodiment of the present disclosure.

The external input interface 135 may be an interface including an HDMI port, which enables HDMI connection.

The external input interface 135 may include a PHY module 400 that is a physical layer and a link module 500 that is a data link layer.

The PHY module 400 may receive a signal input from a source device, process the received signal, and transmit the processed signal to the LINK module 500.

The PHY module 400 may include a PHY controller 401 that controls components in the PHY module 400.

The PHY module 400 may include an on-die termination (ODT) 402 that maintains an HDMI connection. The on-die termination 402 may establish a plurality of HDMI channels, and may include a first on-die termination 4021, a second on-die termination 4022, a third on-die termination 4023 and a fourth on-die termination 4024.

Also, the PHY module 400 may include a continuous time linear equalizer (CTLE) 403. The continuous time linear equalizer 403 may include a first continuous time linear equalizer 4031, a second continuous time linear equalizer 4032, a third continuous time linear equalizer 4033 and a fourth continuous time linear equalizer 4034.

In addition, the PHY module 400 may include a decision-feedback equalizer (DFE) 404. The decision-feedback equalizer 404 may include a first decision-feedback equalizer 4041, a second decision-feedback equalizer 4042, a third decision-feedback equalizer 4043, and a fourth decision-feedback equalizer 4044.

The LINK module 500 may receive and process data which is processed by the PHY module 400 and transmit the processed data to a module for image processing (not shown).

The LINK module 500 may include a fake connection information processing unit 501. The fake connection information processing unit 501 may generate fake connection information based on information received by the LINK module 500.

The LINK module 500 may recognize that a connection to an external input is established by processing the fake connection information.

Meanwhile, the PHY module 400 may include a phase-locked loop (PLL) 405 for clock recovery.

In addition, the PHY module 400 may include a PHY power supply unit s406 that supplies power to components in the PHY module 400.

Figure 8:
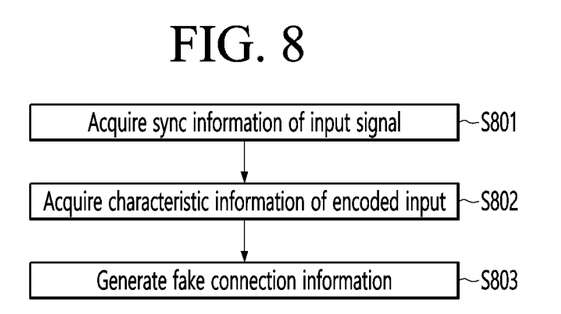
FIG. 8 is a flowchart for describing a method of generating fake connection information according to an embodiment of the present disclosure.

FIG. 8 is a flowchart for describing a method of generating fake connection information according to an embodiment of the present disclosure.

The processor 170 may acquire sync information input from the source device 300 to the external input interface 135 (S801).

In addition, the processor 170 may store sync information input to the external input interface 135.

The sync information may include resolution information, frame information, V-sync (Vertical Synchronization) information, H-sync (Horizontal Synchronization) information, and the like.

In addition, the processor 170 may acquire characteristic information of an encrypted signal input from a first source device (S802).

The encrypted signal may be active data encrypted through HDCP authentication. The active data may include image data received from the source device.

The processor 170 may monitor the characteristics of the encrypted signal and acquire the characteristic information of the encrypted signal.

The processor 170 may extract a pattern of the characteristic information of the encrypted signal. The processor 170 may generate fake connection information by generating a signal having a pattern similar to the extracted pattern.

The processor 170 may generate the fake connection information for maintaining a connection between the source device 300 and an external input interface based on the syn information and the characteristic information of the encrypted signal (S803).

The processor 170 may recognize that a connection to an external device is established by using the fake connection information even when some of the components of the external input interface 135 are turned off.

The processor 170 may switch the external input interface 135 to a standby mode (S605).

For example, the processor 170 may turn off the continuous time linear equalizer 403 and the decision-feedback equalizer 404 included in the PHY module 400 of the external input interface 135.

In addition, even when the external input interface 135 is switched, the processor 170 may maintain the ON state of the on-die termination 402 included in the PHY module 400.

Figure 9:
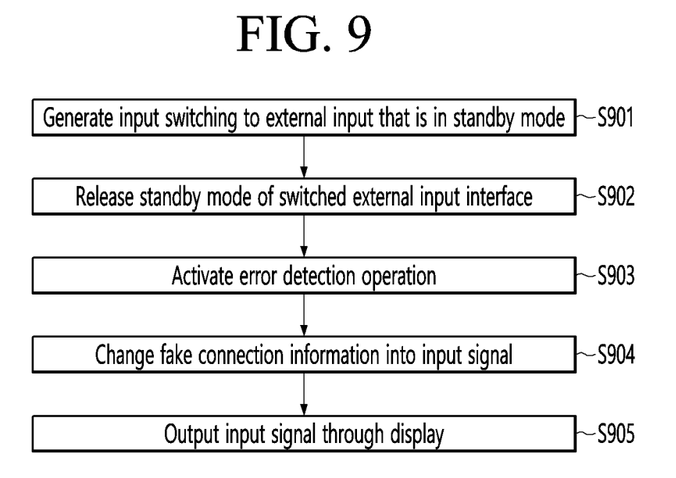
FIG. 9 is a flowchart for describing an input switching method according to an embodiment of the present disclosure.

FIG. 9 is a flowchart for describing an input switching method according to an embodiment of the present disclosure.

The processor 170 may receive an input for selecting an external input that is in a standby mode and perform input switching to the selected external input (S901).

The processor 170 may release the standby mode of the external input interface 135 that had been in the standby mode.

The processor 170 may turn on the continuous time linear equalizer 403 and the decision feedback equalizer 404 of the external input interface 135. Accordingly, a signal input from the source device 300 may be received.

The processor 170 may again activate error detection operation which has been deactivated (S903). Accordingly, even when the fake connection information is replaced with information received from the source device, an error may be detected.

The processor 170 may change the fake connection information into a signal input from an external input port (S904).

For example, the processor 170 may replace the fake connection information with a signal received from the source device so as to output a signal received from a source device connected through a newly selected input port.

The processor 170 may output an input signal through the display (S905).

Accordingly, when input switching occurs because an external input port that has not been selected is selected, the processor 170 may output an input signal through the display without an additional connection process, thereby reducing a switching delay time.

Figure 10:
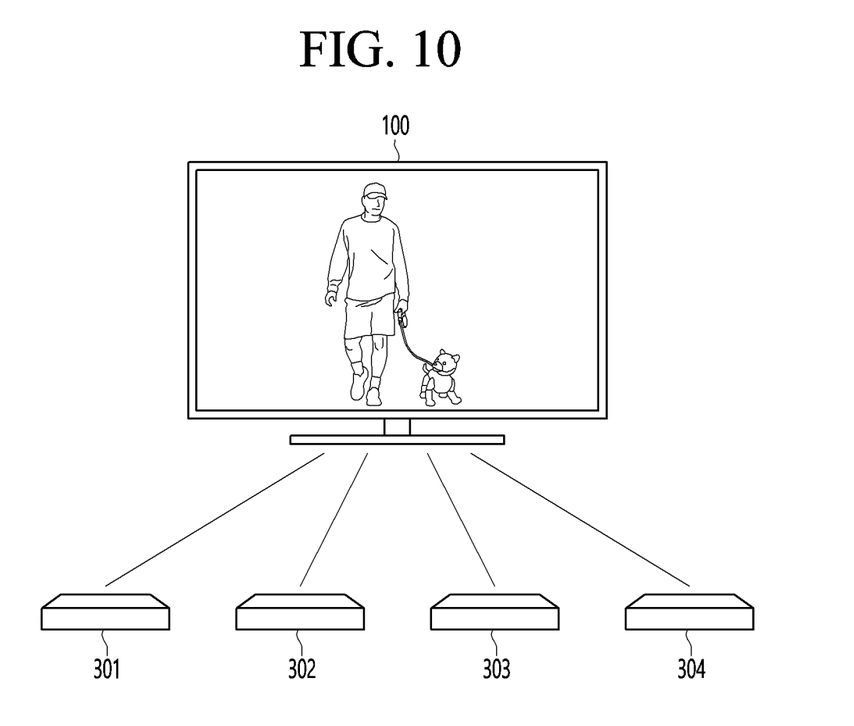
FIG. 10 is an exemplary diagram showing a situation in which a plurality of source devices are connected according to an embodiment of the present disclosure.

FIG. 10 is an exemplary diagram showing a situation in which a plurality of source devices are connected according to an embodiment of the present disclosure.

The display device 100 may be connected to a first source device 301, a second source device 302, a third source device 303, and a fourth source device 304.

When a user watch an image received from the first source device 301, a first input port may be selected. The display device 100 may perform control such that remaining ports enter a standby mode that low power is consumed. When an input for selecting one of the second source device 302, the third source device 303, and the fourth source device 304 is received from a user, the display device 100 may perform control such that an input image is output without going through a predetermined connection process.

Figure 11:
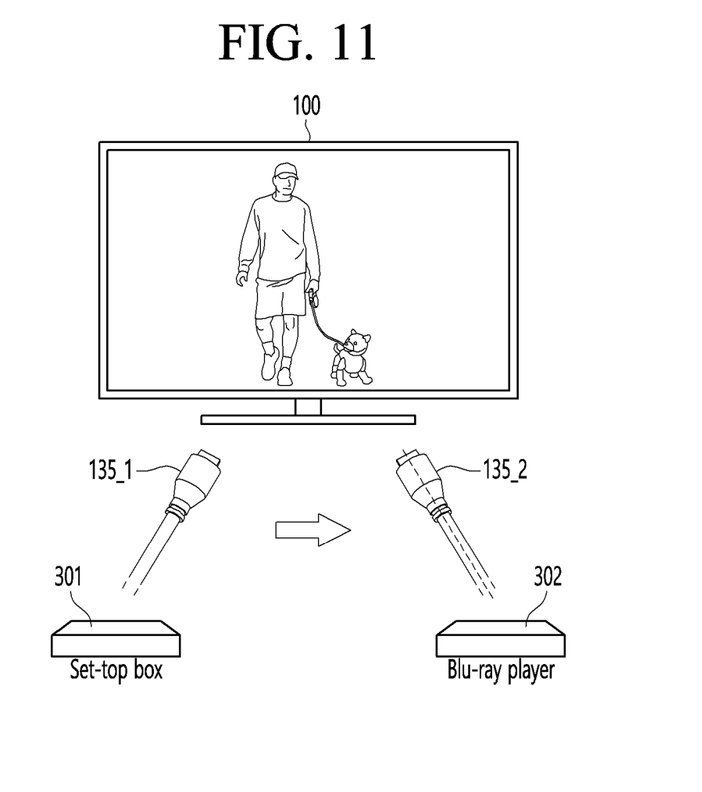
FIG. 11 is an exemplary diagram of input switching according to an embodiment of the present disclosure.

FIG. 11 is an exemplary diagram of input switching according to an embodiment of the present disclosure.

When the second external input interface 135_2 to which the second source device 302 is connected is selected from the first external input interface 135_1 to which the first source device 301 is connected, the display device 100 may allow an input image to be output without going through a predetermined connection process.

The above description is merely illustrative of the technical idea of the present disclosure, and various modifications and variations may be made without departing from the essential characteristics of the present disclosure by those skilled in the art to which the present disclosure pertains.

Accordingly, the embodiment disclosed in the present invention is not intended to limit the technical idea of the present invention but to describe the present invention, and the scope of the technical idea of the present invention is not limited by the embodiment.

The scope of protection of the present disclosure should be interpreted by the following claims, and all technical ideas within the scope equivalent thereto should be construed as being included in the scope of the present disclosure.

What is claimed is:

1. A display device comprising:
a plurality of input ports, wherein an external input interface corresponds to each of the plurality of input ports; and
a processor configured to:
detect that a source device is connected through an unselected input port of the plurality of input ports;
activate an external input interface corresponding to the unselected input port through exchange of a high bandwidth digital content protection (HDCP) key;
perform a connection process between the source device and the external input interface after activating the external input interface;
deactivate an error detection operation between the source device and the external input interface;
generate fake connection information for maintaining connection between the source device and the external input interface based on information input to the external input interface from the source device; and
switch the external input interface to a standby mode, wherein the fake connection information is not detected as an error object while the error detection operation is deactivated.

2. The display device of claim 1, wherein the processor is further configured to:
acquire sync information of a signal input from the source device; and
acquire characteristic information of an encrypted signal input from the source device;
wherein the fake connection information is generated based on the sync information and the characteristic information of the encrypted signal.

3. The display device of claim 1, wherein the external input interface includes a PHY module that is a physical layer and a LINK module that is a data link layer.

4. The display device of claim 3, wherein the processor is further configured to, when the external input interface is switched to the standby mode:
turn off a continuous time linear equalizer (CTLE) and a decision feedback equalizer (DFE) included in the PHY module; and
maintain an ON state of an on-die termination (ODT) in the PHY module.

5. The display device of claim 4, wherein the processor is further configured to, in response to receiving an input for selecting the external input interface:
release the standby mode of the external input interface;
activate the deactivated error detection operation;
change the fake connection information to a signal input to the external input interface; and
output the input signal through a display of the display device.

6. The display device of claim 5, wherein the processor is further configured to turn on the continuous time linear equalizer (CTLE) and the decision feedback equalizer (DFE) when the standby mode of the external input interface is released.

7. A method for performing input switching between input ports in a display device, the method comprising:
detecting that a source device is connected through an unselected input port of a plurality of input ports of the display device;

activating an external input interface corresponding to the unselected input port through exchange of a high bandwidth digital content protection (HDCP) key;

performing a connection process between the source device and the external input interface after activating the external input interface;

deactivating an error detection operation between the source device and the external input interface;

generating fake connection information for maintaining connection between the source device and the external input interface based on information input to the external input interface from the source device; and switching the external input interface to a standby mode, wherein the fake connection information is not detected as an error object while the error detection operation is deactivated.

8. The method of claim 7, wherein performing the connection process includes transmitting a Hot Plug Detect (HPD) signal and Extended Display Identification Data (EDID) information to the source device, and exchanging a High-bandwidth Digital Content Protection (HDCP) key with the source device.

9. The method of claim 7, further comprising:
acquiring sync information of a signal input from the source device; and
acquiring characteristic information of an encrypted signal input from the source device;
wherein the fake connection information is generated based on the sync information and the characteristic information of the encrypted signal.

10. The method of claim 9, further comprising:
extracting a pattern of the characteristic information of the encrypted signal;
wherein the fake connection information is generated further based on the sync information and the extracted pattern.

11. The method of claim 7, wherein the external input interface includes a PHY module that is a physical layer and a LINK module that is a data link layer.

12. The method of claim 11, further comprising turning off a continuous time linear equalizer (CTLE) and a decision feedback equalizer (DFE) included in the PHY module when the external input interface is switched to the standby mode.

13. The method of claim 12, further comprising maintaining an ON state of an on-die termination (ODT) in the PHY module when the external input interface is switched to the standby mode.

14. The method of claim 13, further comprising:
receiving an input for selecting the unselected input port;
releasing the standby mode of the external input interface;
activating the deactivated error detection operation;
changing the fake connection information into a signal input through the external input interface; and
outputting the input signal through a display of the display device.

15. The method of claim 14, further comprising turning on the continuous time linear equalizer (CTLE) and the decision feedback equalizer (DFE) when the standby mode of the external input interface is released.

* * * * *